US009487209B2

(12) United States Patent
Hirai (10) Patent No.: US 9,487,209 B2
(45) Date of Patent: Nov. 8, 2016

(54) HYBRID VEHICLE

(71) Applicant: Makoto Hirai, Toyota (JP)

(72) Inventor: Makoto Hirai, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/770,571

(22) Filed: Feb. 19, 2013

(65) Prior Publication Data

US 2013/0226379 A1    Aug. 29, 2013

(30) Foreign Application Priority Data

Feb. 28, 2012 (JP) ................................. 2012-041445

(51) Int. Cl.
| | |
|---|---|
| *B60W 20/00* | (2016.01) |
| *B60K 6/445* | (2007.10) |
| *B60W 50/08* | (2012.01) |
| *B60W 50/00* | (2006.01) |

(52) U.S. Cl.
CPC ............. *B60W 20/20* (2013.01); *B60K 6/445* (2013.01); *B60W 20/10* (2013.01); *B60W 50/082* (2013.01); *B60W 2050/0089* (2013.01); *B60W 2510/244* (2013.01); *B60W 2540/04* (2013.01); *B60Y 2400/214* (2013.01); *Y02T 10/6239* (2013.01); *Y02T 10/6269* (2013.01); *Y10S 903/903* (2013.01)

(58) Field of Classification Search
CPC .... B60W 10/06; B60W 10/08; B60W 10/26; B60W 20/20; B60W 20/40
See application file for complete search history.

(56) References Cited

U.S. PATENT DOCUMENTS

| | | | | |
|---|---|---|---|---|
| 5,150,034 | A | * | 9/1992 | Kyoukane et al. ............. 322/10 |
| 5,670,830 | A | | 9/1997 | Koga et al. |
| 2010/0056312 | A1 | * | 3/2010 | Akutsu et al. .................... 475/1 |
| 2010/0280687 | A1 | * | 11/2010 | Tate et al. ........................ 701/22 |

FOREIGN PATENT DOCUMENTS

| | | |
|---|---|---|
| JP | 08-019114 A | 1/1996 |
| JP | 2010167898 A | 8/2010 |
| JP | 2011066957 A | 3/2011 |
| JP | 2011161950 A | 8/2011 |

* cited by examiner

*Primary Examiner* — Todd Melton
*Assistant Examiner* — Jason Roberson
(74) *Attorney, Agent, or Firm* — Dinsmore & Shohl LLP (57) ABSTRACT

A hybrid vehicle includes: an electricity storage device configured to output electric power to and receives electric power from a vehicle-driving electric motor and to be charged with electricity generated by using output of an engine; an external charging portion that charges the electricity storage device with electric power supplied from outside the vehicle; and a control device that controls switching between the traveling of the vehicle which does not use the engine but uses the electric motor and the traveling which uses the engine. The control device restrains the traveling that uses the engine, during a period until charging is newly executed by the external charging portion, if degree of execution of the traveling that uses the engine following previous execution of the external charging is greater than a predetermined degree.

6 Claims, 8 Drawing Sheets

HYBRID VEHICLE

INCORPORATION BY REFERENCE

The disclosure of Japanese Patent Application No. 2012-041445 filed on Feb. 28, 2012 including the specification, drawings and abstract is incorporated herein by reference in its entirety.

BACKGROUND OF THE INVENTION

1. Field of the Invention

The invention relates to a hybrid vehicle. More particularly, the invention relates to a hybrid vehicle configured so that an electricity storage device mounted in the vehicle can be charged by an electric power source provided outside the vehicle.

2. Description of Related Art

In recent years, there have been proposed hybrid vehicles in which an on-board electricity storage device is charged with electric power from an electric power source provided outside the vehicle (an external electric power source) such as a commercial electric power source or the like. A vehicle whose electricity storage device is chargeable from an external electric power source is referred to as a plug-in type hybrid vehicle. A plug-in type hybrid vehicle achieves high energy efficiency when it travels while keeping the engine in a stopped state as much as possible. Therefore, one of two travel modes, that is, a travel mode that maintains the stopped state of the engine and uses only an electric motor as a drive force source or a travel mode that uses both the engine and the electric motor, is selectively engaged. The travel mode in which the engine is kept in the stopped state and only the electric motor is used as a drive force source is referred to as the EV (electric vehicle) traveling. The travel mode in which the engine and the electric motor are used is referred to as the HV (hybrid vehicle) traveling.

A plug-in type hybrid vehicle has two electric power source modes of charging the electricity storage device. The two electric power source modes are supply of electric power to the electricity storage device based on electric power generating operation that utilizes motive power of the engine and supply of electric power to the electricity storage device from an external electric power source. Hereinafter, the charging of the electricity storage device during the HV traveling is expressed also as "internal charging". Furthermore, the charging of the electricity storage device from an external electric power source is expressed also as "external charging". Japanese Patent Application Publication No. 2010-167898 (JP 2010-167898 A) discloses one form of a control of the charging of the electricity storage device. Specifically, the publication describes a hybrid vehicle that avoids the engine being operated for the purpose of the internal charging if the external charging has started and the SOC (state of charge) of the electricity storage device is smaller than a predetermined lower limit value.

In the plug-in type hybrid vehicles, if at the time of the external charging, the electricity storage device is charged to a fully charged level, the cruising range at the time of EV traveling (hereinafter, also referred to as "EV traveling distance") can be extended. This improves fuel economy. Furthermore, this also reduces the amounts of emissions. However, in a usage manner where only the internal charging is repeatedly performed, it becomes difficult to appropriately secure opportunities for the external charging. As a result, the EV traveling distance declines. Therefore, there is possibility that the advantages of the plug-in hybrid vehicle cannot be fully exploited.

SUMMARY OF THE INVENTION

The invention provides a hybrid vehicle that is equipped with an electricity storage device capable of being charged by the external charging and that appropriately secures opportunities for the external charging.

A hybrid vehicle of one aspect of the present invention is provided with an engine and an electric motor that is used to drive the vehicle. The hybrid vehicle includes: an electricity storage device that outputs electric power to the electric motor and receives electric power from the electric motor and that is charged with electricity generated by using output of the engine; an external charging portion that charges the electricity storage device with electric power supplied from outside the vehicle; and a control device that controls switching between traveling of the vehicle which does not use the engine but uses the electric motor and traveling of the vehicle which uses the engine. The control device restrains the traveling that uses the engine, during a period until the charging is newly executed by the external charging portion, if degree of execution of the traveling that uses the engine following previous execution of the charging by the external charging portion is greater than a predetermined degree.

According to the aspect of the invention, in a hybrid vehicle provided with an electricity storage device which is charged with electric power supplied from outside the vehicle, it is possible to appropriately secure opportunities for external charging for charging the electricity storage device with electric power supplied from outside the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described in detail hereinafter with reference to the accompanying drawings. The same or comparable portions are denoted by the same reference characters in the drawings, and descriptions of the same or comparable portions will not be repeated below.

Figure 1:
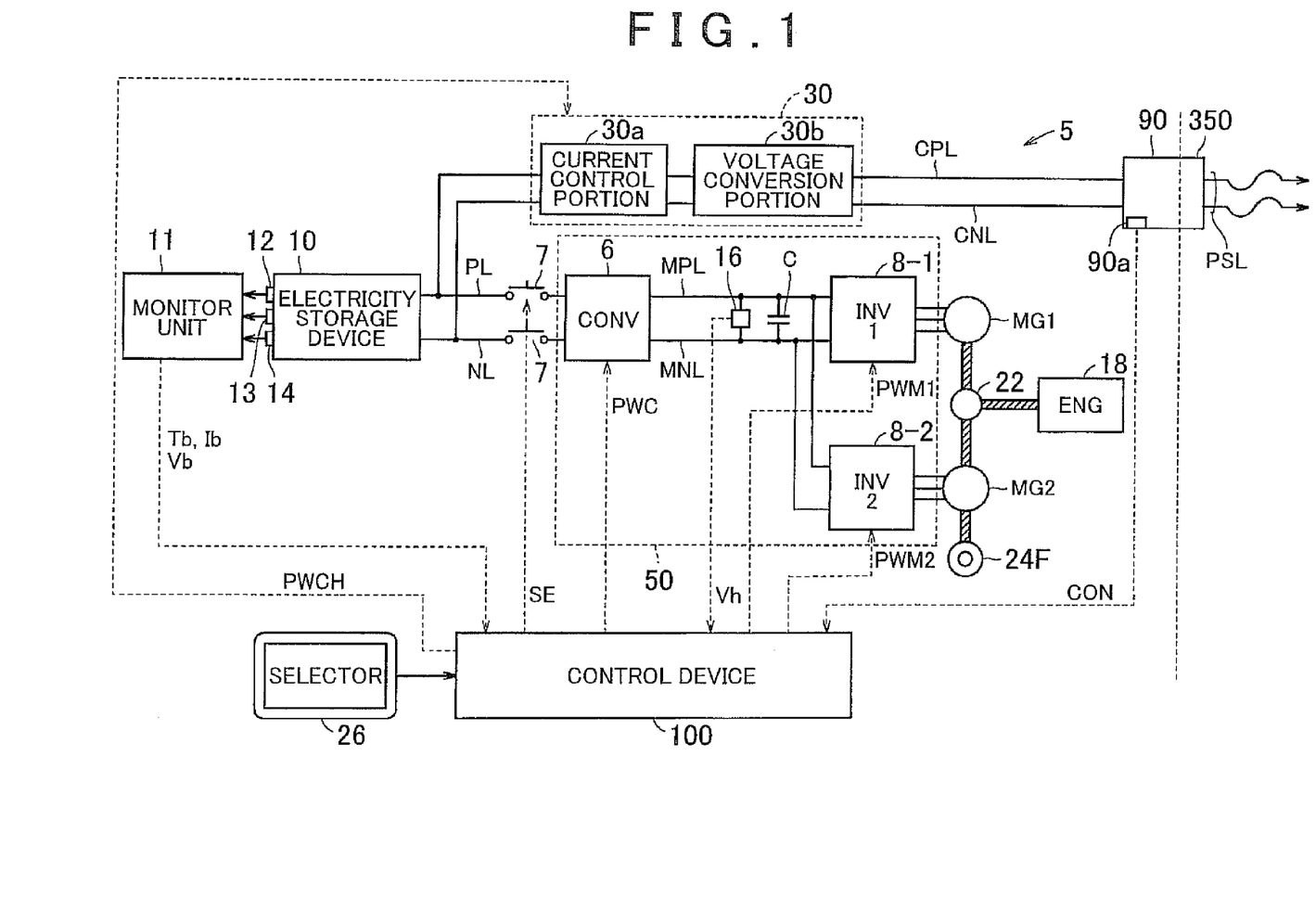
FIG. 1 is a general block diagram showing a construction of a hybrid vehicle according to an embodiment of the invention.

FIG. 1 is a general block diagram showing a construction of a hybrid vehicle according to an embodiment of the invention.

Hereinafter, description will be made with reference to FIG. 1. A hybrid vehicle 5 is equipped with an engine 18 and motor-generators MG1 and MG2. Furthermore, the hybrid vehicle 5 is also equipped with an electricity storage device 10. The electricity storage device 10 outputs electric power to the motor-generators MG1 and MG2 and also receives electric power therefrom.

The electricity storage device 10 is a rechargeable electric power storage element. Representatively, the electricity storage device 10 is a secondary battery such as a lithium-ion battery, a nickel metal hydride battery, etc. Alternatively, the electricity storage device 10 may also be constructed of an electric power storage element other than the batteries, for example, an electric double layer capacitor or the like. FIG. 1 shows a system construction related to a charging-discharging control of the electricity storage device 10 of the hybrid vehicle 5.

A monitor unit 11 detects a "state value" of the electricity storage device 10 on the basis of signals from a temperature sensor 12, a voltage sensor 13 and an electric current sensor 14. The temperature sensor 12, the voltage sensor 13 and the electric current sensor 14 are provided on the electricity storage device 10. As stated above, the electricity storage device 10 typically employs a secondary battery. Therefore, the temperature Tb, the voltage Vb and the current Ib of the electricity storage device 10 will also be referred to as the battery temperature Tb, the battery voltage Vb and the battery current Ib. Furthermore, the battery temperature Tb, the battery voltage Vb and the battery current Ib will also be collectively referred to as "battery data".

The temperature sensor 12, the voltage sensor 13 and the current sensor 14 comprehensively indicate the temperature sensors, the voltage sensors and the current sensors provided for the electricity storage device 10. That is, in reality, as for at least one of the temperature sensor 12 and the voltage sensor 13, a plurality of sensors are usually provided.

The engine 18 is, for example, an internal combustion engine such as a gasoline engine, diesel engine, etc. An external combustion engine may also be used instead of the internal combustion engine.

The engine 18, the motor-generator MG1 and the motor-generator MG2 are mechanically interlinked via a power splitting mechanism 22. The power splitting mechanism 22 is made up of a planetary gear mechanism. The power splitting mechanism 22 is a power transmission device that mechanically links three elements. The three elements are the crankshaft of the engine 18, the rotating shaft of the motor-generator MG1 and the rotating shaft of the motor-generator MG2. The power splitting mechanism 22 allows transmission of motive power between two of the three elements by using the other one of the elements as a reaction element.

Figure 3:
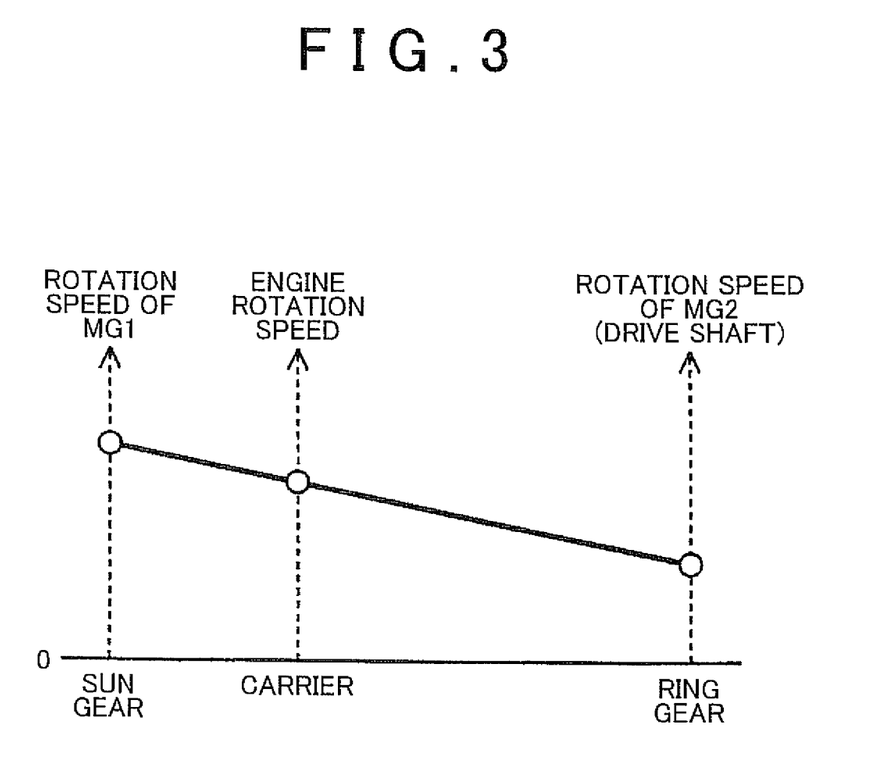
FIG. 3 is an alignment chart of the power splitting mechanism.

Due to the linkage via the power splitting mechanism 22, the rotation speeds of the engine 18 and the motor-generators MG1 and MG2 in the hybrid vehicle 5 have such relations that the rotation speeds thereof are connected by a straight line in an alignment chart as shown in FIG. 3.

Figure 2:
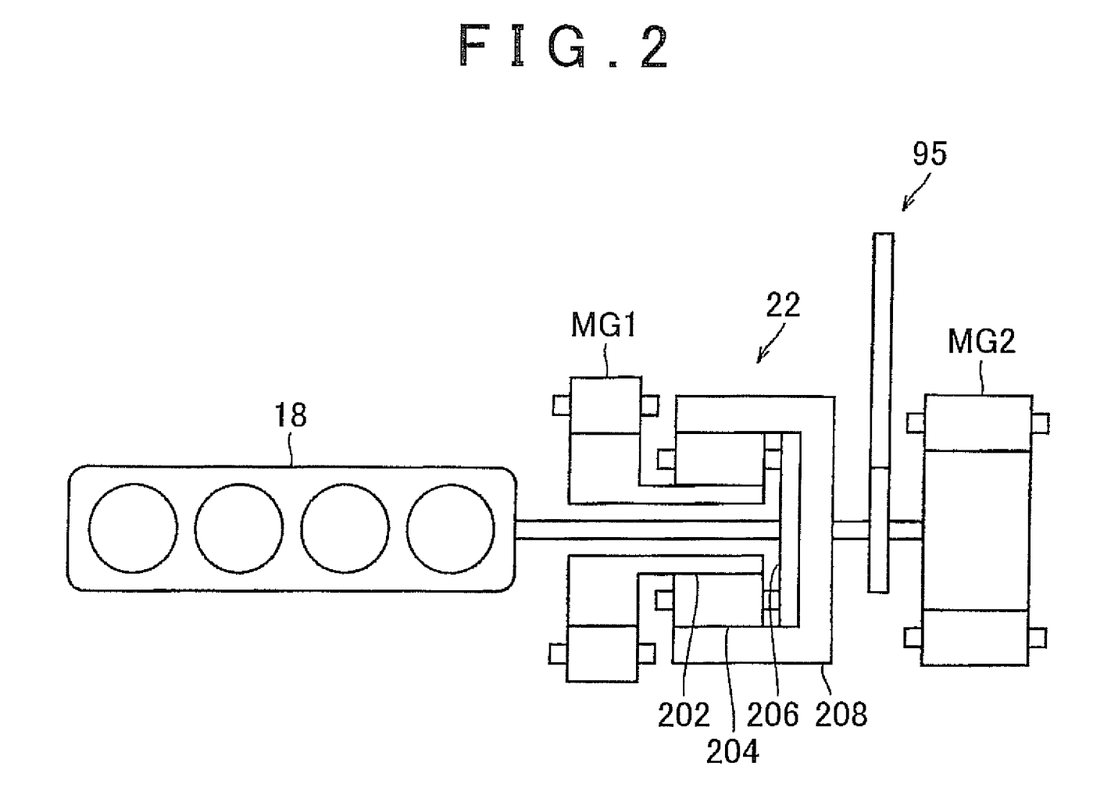
FIG. 2 is a construction diagram of a power splitting mechanism shown in FIG. 1.

With reference to FIG. 2, the power splitting mechanism 22 will be further described. The power splitting mechanism 22 is constructed of a planetary gear that includes a sun gear 202, pinions 204, a carrier 206 and a ring gear 208.

The pinions 204 mesh with the sun gear 202 and the ring gear 208. The carrier 206 supports the pinions 204 so that each pinion 204 is rotatable about its own axis. The sun gear 202 is linked to the rotating shaft of the motor-generator MG1. The carrier 206 is linked to the crankshaft of the engine 18. The ring gear 208 is linked to the rotating shaft of the motor-generator MG2 and to a speed reducer 95.

The speed reducer 95 transfers rotational drive force to a driving wheel 24F. The speed reducer 95 transfers motive power from the power splitting mechanism 22 (the ring gear 208) to the driving wheel 24F. Furthermore, the speed reducer 95 transfers to the power splitting mechanism 22 (the ring gear 208) the reaction force that the driving wheel 24F receives from the road surface, as accelerating torque or decelerating torque. That is, the ring gear 208 corresponds to a drive shaft in the hybrid vehicle 5.

The motor-generator MG1 has a function as a generator that generates electricity by using motive power from the engine 18 which is split by the power splitting mechanism 22. That is, while the hybrid vehicle 5 is traveling, the electricity storage device 10 is able to be charged with the electric power generated by the motor-generator MG1 driven by the engine 18. Conversely, the motor-generator MG1 is able to output torque that rotationally drives the crankshaft of the engine 18 via the power splitting mechanism 22, by using electric power from the electricity storage device 10. Therefore, the motor-generator MG1 has a function as an electric motor that starts the engine 18. Furthermore, the motor-generator MG1 also has a function as an electric motor for motoring the engine 18.

The motor-generator MG2 has a function as a vehicle-driving electric motor that gives drive force to the driving wheel 24F by using at least one of electric power stored in the electricity storage device 10 and electric power generated by the motor-generator MG1. Furthermore, the motor-generator MG2 also has a function as a generator that generates electricity by regenerative braking.

While the hybrid vehicle 5 is traveling, the power splitting mechanism 22 divides the drive force that is produced by operation of the engine 18. Then, the power splitting mechanism 22 distributes one of the divided drive forces to the motor-generator MG1 side. Furthermore, the power splitting mechanism 22 distributes the other one of the divided drive forces to the motor-generator MG2 side. The drive force distributed from the power splitting mechanism 22 to the motor-generator MG1 side is used for the electricity generation operation. On the other hand, the drive force distributed to the motor-generator MG2 side is combined with the drive force produced by the motor-generator MG2. Then, the drive force distributed to the motor-generator MG2 side is used to drive the driving wheel 24F. Thus, the distribution and combination of the drive forces between the three drive force sources, that is, the engine 18 and the motor-generators MG1 and MG2, via the power splitting mechanism 22, is carried out according to the travel situation of the hybrid vehicle 5. As a result, the driving wheel 24F is driven.

The hybrid vehicle 5 is also capable of traveling on only the output of the motor-generator MG2 while the engine 18 is in a stopped state. In this state, the rotation speed of the engine 18 (i.e., of the carrier 206) is zero. The ring gear 208 of the motor-generator MG2 rotates in a positive direction, and the sun gear 202 of the motor-generator MG1 rotates in the negative direction. Due to this, the hybrid vehicle 5 conducts the EV traveling.

The hybrid vehicle 5 is capable of switching from the EV traveling to the HV traveling by operating the motor-generator MG1 as an electric motor (starter) to crank the engine 18.

The hybrid vehicle 5 pursues improved fuel economy by operating the engine 18 at an operating point of high efficiency. Therefore, at the time of starting the vehicle or at the time of traveling with light load at which the operating point of the engine 18 is of low rotation speed and low torque, the EV traveling is selected. If the vehicle speed or the traveling load increases and the vehicle state reaches a state in which the engine 18 can operate at an operating point of high efficiency, the HV traveling is selected in place of the EV traveling. During the HV traveling, while the operating point of the engine 18 is kept in a high-efficiency region, the shortfall in power or torque is adjusted or offset by the output of the motor-generator MG1 or MG2.

With reference to FIG. 1 again, a construction of an electric system of the hybrid vehicle 5 will be described. The hybrid vehicle 5 is further equipped with an electric power control unit (PCU) 50. The PCU 50 converts electric power in both directions between the electricity storage device 10 and each of the motor-generator MG1 and the motor-generator MG2. The PCU 50 includes a converter (CONV) 6, a first inverter (INV1) 8-1, and a second inverter (INV2) 8-2 that is disposed to correspond to the motor-generator MG2. The first inverter 8-1 is disposed to correspond to the motor-generator MG1. The second inverter 8-2 is disposed to correspond to the motor-generator MG2.

The converter (CONV) 6 executes direct-current voltage conversion between the electricity storage device 10 and a positive bus line MPL in both directions. The positive bus line MPL transfers direct-current link voltages of the inverters 8-1 and 8-2. That is, the input-output voltage of the electricity storage device 10 and the direct-current voltage between the positive bus line MPL and the negative bus line MNL increase or decrease in both directions. The voltage-raising and lowering operations of the converter 6 are each controlled in accordance with a switching command PWC from a control device 100. Then, the direct-current voltage Vh between the positive bus line MPL and the negative bus line MNL is detected by a voltage sensor 16.

The first inverter 8-1 and the second inverter 8-2 execute bi-directional electric power conversion between the direct-current electric power of the positive bus line MPL and the negative bus line MNL and the alternating-current electric power input to and output from the motor-generators MG1 and MG2. Mainly, the first inverter 8-1 converts the alternating-current electric power that the motor generator MG1 generates from output of the engine 18 into direct-current electric power, according to a switching command PWM1 from the control device 100. Then, the first inverter 8-1 supplies the converted direct-current electric power to the positive bus line MPL and the negative bus line MNL. Due to this, the electricity storage device 10 can be actively charged with output of the engine 18 even while the vehicle is traveling.

Furthermore, at the time of starting the engine 18, the first inverter 8-1 converts the direct-current electric power from the electricity storage device 10 into alternating-current electric power according to the switching command PWM1 from the control device 100. Then, the first inverter 8-1 supplies the converted alternating-current electric power to the motor-generator MG1. Due to this, the engine 18 can be started by using the motor-generator MG1 as a starter.

The second inverter 8-2 converts the direct-current electric power supplied via the positive bus line MPL and the negative bus line MNL into alternating-current electric power according to a switching command PWM2 from the control device 100. Then, the second inverter 8-2 supplies the converted alternating-current electric power to the motor generator MG2. Due to this, the motor-generator MG2 produces drive force for the hybrid vehicle 5.

At the time of regenerative braking of the hybrid vehicle 5, the motor-generator MG2 generates alternating-current electric power in association with the deceleration of the drive wheel 24F. At this time, the second inverter 8-2 converts the alternating-current electric power generated by the motor-generator MG2 into direct-current electric power according to the switching command PWM2 from the control device 100. Then, the second inverter 8-2 supplies the converted direct-current electric power to the positive bus line MPL and the negative bus line MNL. Due to this, the electricity storage device 10 is charged when the vehicle decelerates or travels down a slope.

A system main relay 7 is provided between the electricity storage device 10 and the PCU 50. The system main relay 7 is interposed between a positive line PL and a negative line NL and is connected with each other. The system main relay 7 switches between an on-state and an off-state in response to a relay control signal SE from the control device 100.

The control device 100 is typically constructed by an electronic control unit (ECU). The ECU is constructed mainly of a CPU (central processing unit), a memory region, and input/output interfaces. The memory region is a RAM (random access memory), a ROM (read-only memory), etc. The control device 100 reads out a program pre-stored in the ROM or the like onto the RAM, and executes the read-out program. Due to this, the control device 100 executes controls related to the traveling of the vehicle and the electrical charging and discharging. At least a portion of the ECU may be constructed by a hardware device, such as an electronic circuit or the like, so as to execute predetermined numerical and logical computations.

FIG. 1 illustrates information that is input to the control device 100, as an example. FIG. 1 shows as examples battery data (the battery temperature Tb, the battery voltage Vb and the battery current Ib) from the monitor unit 11, and the direct-current voltage Vh. The battery data is input from the monitor unit 11. The direct-current voltage Vh is input from the voltage sensor 16 that is disposed between the positive bus line MPL and the negative bus line MNL. Detected electric current values of each phase of the motor-generators MG1 and MG2 and detected rotation angle values of the motor-generators MG1 and MG2 are also input to the control device 100 (not shown).

The hybrid vehicle 5 is further equipped with a connector receptacle portion 90 and an external charging portion 30 as constructions for charging the electricity storage device 10 from an external device (i.e., the external charging of the electricity storage device 10). Furthermore, the hybrid vehicle 5 is equipped with a selector switch 26. Using the selector switch 26, a user of the hybrid vehicle 5 forces a travel mode described below to be selected. The selector switch 26 is provided, for example, near a driver's seat.

When a connector portion 350 is linked to the connector receptacle portion 90, electric power from an external electric power source is supplied to the external charging portion 30 via a positive charging line CPL and a negative charging line CNL. Besides, the connector receptacle portion 90 includes a linkage detecting sensor 90a. The linkage detecting sensor 90a detects a linked state between the connector receptacle portion 90 and the connector portion 350. By a linkage signal CON from the linkage detecting sensor 90a, the control device 100 detects that there has been established a state in which the electricity storage device 10 can be charged from the external electric power source. The external electric power source is typically a single-phase alternating-current commercial electric power source. Instead of or in addition to the commercial electric power source, electric power of an external electric power source may be supplied by electric power generated by a solar battery panel disposed on a house's roof or the like.

The connector portion 350 constitutes a linkage mechanism that supplies electric power from an external electric power source to the hybrid vehicle 5. For example, the connector portion 350 is linked to a charging station (not shown) via an electric power line PSL. The electric power line PSL is made up of a cabtyre cable or the like. Furthermore, the charging station is equipped with an external electric power source. Then, at the time of the external charging, the connector portion 350 is linked to the hybrid vehicle 5. Due to this, the connector portion 350 electrically connects the external electric power source and the external charging portion 30 mounted in the hybrid vehicle 5. The hybrid vehicle 5 is provided with the connector receptacle portion 90. The connector receptacle portion 90, when linked to the connector portion 350, receives the external electric power source to the hybrid vehicle 5.

The hybrid vehicle 5 may receive electric power from an external electric power source, by a construction that supplies electric power from an external electric power source to the vehicle by electromagnetic coupling in a non-contact manner, instead of the construction shown in FIG. 1. Concretely, a primary coil is provided on the external electric power source end and a secondary coil is provided on the vehicle end. Then, supply of electric power is carried out by utilizing the mutual inductance between the primary coil and the secondary coil.

The external charging portion 30 is a device that charges the electricity storage device 10 by using electric power from an external electric power source. The external charging portion 30 is disposed between the positive and negative lines PL and NL and the positive and negative charging lines CPL and CNL. The external charging portion 30 includes an electric current control portion 30a and a voltage conversion portion 30b. The external charging portion 30 converts electric power from an external electric power source into electric power suitable for the charging of the electricity storage device 10, according to a control signal PWCH from the control device 100.

Concretely, the voltage conversion portion 30b has a function of converting the supply voltage of the external electric power source into a voltage suitable for the charging of the electricity storage device 10. The voltage conversion portion 30b is typically made up of a voltage transformer, an AC-AC switching regulator, etc. The voltage transformer is of a winding wire type that has a predetermined ratio of transformation. The electric current control portion 30a rectifies the alternating-current voltage that has been converted in voltage by the voltage conversion portion 30b to produce direct-current voltage. Furthermore, the voltage conversion portion 30b controls the charging current that is supplied to the electricity storage device 10, in accordance with a control signal from the control device 100. The electric current control portion 30a is typically made up of a single-phase bridge circuit or the like. Instead of the construction made up of the electric current control portion 30a and the voltage conversion portion 30b, an AC-DC switching regulator or the like may be used to realize the external charging portion 30.

In the hybrid vehicle 5 according to the embodiment of the invention, the electricity storage device 10 can be charged with electric power generated by the motor-generator MG1 while the vehicle 5 is traveling. Furthermore, in the hybrid vehicle 5 according to the embodiment of the invention, the electricity storage device 10 can be charged by an external electric power source after the vehicle 5 finishes traveling. In the description below, in order to discriminate the aforementioned charging operations, the charging of the electricity storage device 10 from an external electric power source will also be termed "external charging", and the charging of the electricity storage device 10 by the engine 18 or the motor-generator MG1 will also be termed "internal charging".

As for the plug-in type hybrid vehicles, it is preferable to travel while maintaining a stopped state of the engine 18 as much as possible, from the viewpoint of fuel economy and the amounts of emissions. To that end, in the hybrid vehicle 5, one of two travel modes is engaged, basically according to the SOC of the electricity storage device 10. The two travel modes are a CS (charge sustaining) mode and a CD (charge depleting) mode. In the CS mode, the SOC of the electricity storage device 10 is kept at a certain constant level. In the CD mode, the hybrid vehicle 5 mainly travels only on the motor-generator MG2 by actively utilizing the SOC of the electricity storage device 10.

Figure 4:
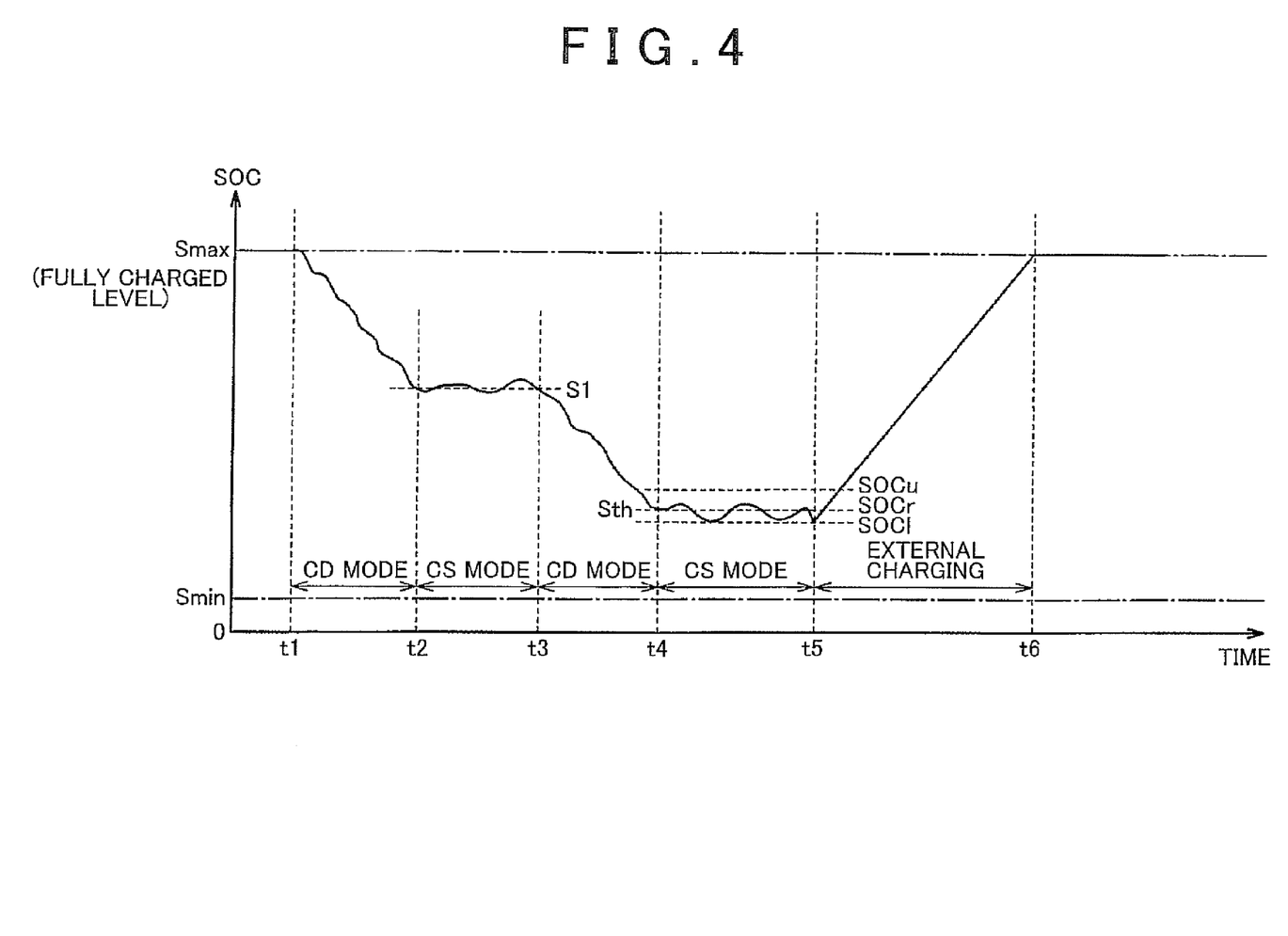
FIG. 4 is a conceptual diagram for describing representative examples of transitions of the travel mode and the SOC in the hybrid vehicle shown in FIG. 1.

FIG. 4 is a conceptual diagram illustrating a representative example of transitions of the travel mode and the SOC in the hybrid vehicle 5.

Hereinafter, description will be made with reference to FIG. 4. Prior to time t1, the electricity storage device 10 is charged to the fully charged level by the external charging. That is, when the vehicle starts to travel, SOC=Smax. At time t1, the ignition switch is turned on and the hybrid vehicle 5 starts to travel. At that time, an estimated value of the SOC (#SOC) is higher than a mode determination criterion value, so that the CD mode is selected.

In the CD mode, the hybrid vehicle 5 basically stops the engine 18 and travels only on drive force from the motor-generator MG2. Therefore, during the CD mode, the power generating operation of the motor-generator MG1 with motive power received from the engine 18 is not performed. Due to this, the charging of the electricity storage device 10 by the motor-generator MG1 is restricted. Incidentally, even during the CD mode, operation of the engine 18 is allowed in the case where special condition is established. The case where a special condition is satisfied includes, for example, the case where a user has greatly depressed the accelerator pedal, the time when an engine-driven type air-conditioner is in operation, the time when the engine is being warmed up, etc. That is, during the CD mode, the starting of the engine 18 for the purpose of the internal charging of the electricity storage device 3 is not carried out. Therefore, the SOC of the electricity storage device 10 gradually declines, except when energy is recovered by regenerative braking.

By operating the selector switch 26, the user can force the CS mode to be selected. That is, the user, by operating the selector switch 26, can force cancellation of the selection of the CD mode. On the other hand, when the selector switch 26 is not operated, the control device 100 automatically selects one of the two travel modes on the basis of the SOC of the electricity storage device 10.

If at time t2, the CS mode is forced to be selected by operating the selector switch 26 during the CD mode (#SOC>Sth), the charging and discharging of the electricity storage device 10 is controlled so that the SOC (=S1) provided at that time point is maintained. That is, an SOC control range is set such that a control center value SOCr of the SOC control range is fixed at an estimated SOC value (#SOC) provided at the time of operation of the selector switch 26.

At time t3, the selector switch 26 is operated again so that the travel mode returns to the CD mode. Then, when the estimated SOC value #SOC declines to the mode determination criterion value Sth at time t4, the travel mode switches from the CD mode to the CS mode. After the travel mode switches to the CS mode, the control center value SOCr is set to the certain value provided for the CS mode. Due to this, the charging and discharging of the electricity storage device 10 is controlled so that the SOC is maintained within a certain range whose center is the control center value SOCr (range of SOCl to SOCu). Therefore, during the CS mode, if the SOC declines, the engine 18 (FIG. 1) is operated. Then, the electricity storage device 10 is charged with electric power generated by the motor-generator MG1. As a result, the SOC begins to increase. Then, the SOC is maintained in the SOC control range (of SOCl to SOCu).

When the hybrid vehicle 5 finishes traveling at time t5, the user (operator) links the connector portion 350 (FIG. 1) to the hybrid vehicle 5, so that the external charging starts. Due to this, the SOC of the electricity storage device 10 begins to rise. At time t6 when the SOC reaches the fully charged level (Smax), the external charging is completed. Then, at time t6, the state assumed prior to time t1 is resumed.

As described above, even when the present travel mode is the CD mode, the engine 18 is operated if there is a drive force request from the user. On another hand, when the present travel mode is the CS mode, the engine 18 is stopped if the SOC of the electricity storage device 10 is greater than the control center value SOCr. However, since operation of the engine 18 is restricted during the CD mode, the operation time of the engine 18 is longer during the CS mode than during the CD mode. In the description below, the traveling of the vehicle in which the engine 18 is stopped and only the motor-generator MG2 is used as a drive force is referred to as "EV traveling", regardless of the travel mode. Furthermore, in the description below, regardless of the travel mode, the traveling of the vehicle in which the engine 18 is operated and the engine 18 and the motor-generator MG2 are used is referred to as "HV traveling".

The electricity storage device 10, during the CS mode, is capable of the internal charging through the use of the engine 18 and the motor-generator MG1 when the HV traveling is conducted. Therefore, unlike the CD mode, during which operation of the engine 18 is restricted, after the travel mode switches to the CS mode, the hybrid vehicle 5 is able to continue the traveling in the CS mode. As a result, there is possibility of the degree of execution (execution frequency) of the HV traveling becoming high, depending on the users (drivers). The heightening of the execution frequency of the HV traveling in this manner is likely to lead to a decline of the degree of execution of the external charging. Then, if the execution frequency of the external charging declines, the cruising range over which the EV traveling is possible (hereinafter, referred to also as "EV traveling distance") is restricted. This gives rise to possibility of failing to fully exploit the advantages of the plug-in type hybrid vehicle, such as improvement of the fuel economy and reduction of the amounts of emissions.

Therefore, in the embodiment of the invention, if the degree of execution of the HV traveling following the previous execution of the external charging (hereinafter, referred to also as "HV traveling execution degree") exceeds a predetermined degree, execution of the HV traveling is restrained during the period until the external charging is newly executed. Due to this, the internal charging of the electricity storage device 10 is restricted. In turn, the external charging of the electricity storage device 10 is relatively actively performed. Due to this, the electricity storage device 10 stores as much electric power as possible after the hybrid vehicle 5 finishes traveling. The "HV traveling execution degree" corresponds to the record of execution of the HV traveling following the previous execution of the external charging. The execution record of the HV traveling is the operation record of the engine 18. For example, the "HV traveling execution degree" includes the cruising distance by the HV traveling and the time duration of execution of the HV traveling. The cruising range based on the HV traveling is referred to also as "HV traveling distance". Furthermore, the time duration of execution of the HV traveling is the time duration of operation of the engine 18.

Figure 5:
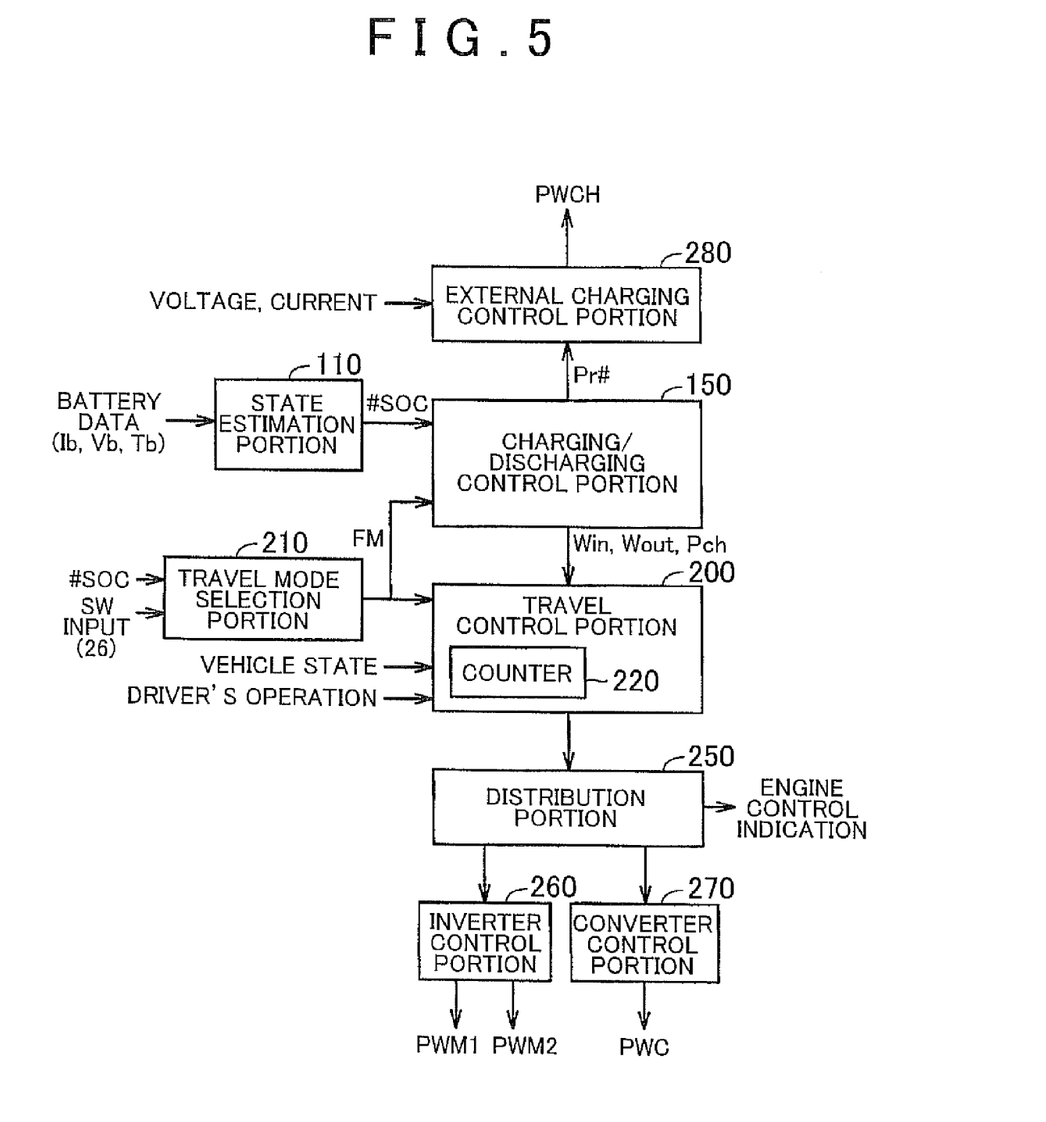
FIG. 5 is a functional block diagram illustrating a travel control in a hybrid vehicle according to the embodiment of the invention.

FIG. 5 is a functional block diagram illustrating a travel control in a hybrid vehicle according to the embodiment of the invention. Functional blocks shown in FIG. 5 can be realized by the control device 100 executing software processes in accordance with pre-set programs. Alternatively, it is also possible to construct within the control device 100 a circuit (hardware device) that has functions that correspond to the functional blocks.

Description will be made hereinafter with reference to FIG. 5. A state estimation portion 110 estimates the SOC of the electricity storage device 10 on the basis of the battery data (Tb, Ib, Vb) from the monitor unit 11. As publicly known, the SOC of a battery is the percentage (0 to 100%) of the present amount of electricity remaining in the battery to the amount of electricity in a state of full charge of the battery. For example, the state estimation portion 110 successively computes an estimated value of the SOC (#SOC) of the electricity storage device 10 on the basis of an integrated value of the amount of charging/discharging of the electricity storage device 10. The integrated value of the amount of charging/discharging is obtained by integrating the multiplication product (electric power) of the battery current Ib and the battery voltage Vb over time. Alternatively, the estimated value of the SOC (#SOC) may be calculated on the basis of the relation between the SOC and the open-circuit voltage (OCV).

A travel mode selection portion 210 selects one of the CD mode and the CS mode on the basis of comparison between the estimated value of the SOC (#SOC) of the electricity storage device 10 and the mode determination criterion value Sth. Alternatively, operation of the selector switch 26 may be reflected in selection of the travel mode. The travel mode selection portion 210 generates a travel mode flag FM. The travel mode flag FM shows which one of the CD mode and CS mode has been selected. The travel mode flag FM is sent out to a charging/discharging control portion 150 and a travel control portion 200.

The charging/discharging control portion 150 sets a charging electric power upper limit value Win and a discharging electric power upper limit value Wout on the basis of the state of the electricity storage device 10. For example, the charging electric power upper limit value Win and the discharging electric power upper limit value Wout are set on the basis of the battery temperature Tb and the estimated SOC value (#SOC). Concretely, the discharging electric power upper limit value Wout is set so as to gradually decrease with decreases in the estimated SOC value (#SOC). On the other hand, the charging electric power upper limit value Win is set so as to gradually decrease with increases in the estimated SOC value (#SOC).

Furthermore, the charging/discharging control portion 150 determines whether it is necessary to charge the electricity storage device 10, and sets a charging electric power command value Pch for the electricity storage device 10.

The charging/discharging control portion 150 sets the charging electric power command value Pch=0 when the CD mode has been selected. That is, during the CD mode, the operation of the engine 18 for the purpose of charging the electricity storage device 10 is not executed in order to keep the SOC within a certain range.

When the CS mode has been selected, the charging/discharging control portion 150 sets the charging electric power command value Pch so as to control the estimated SOC value (#SOC) within a certain range. The certain range is, for example, the range of SOCl to SOCu shown in FIG. 4. For example, when it is established that #SOC<SOCr, the charging/discharging control portion 150 sets the charging electric power command value Pch>0 in order to indicate the charging of the electricity storage device 10. If during a stop of the engine 18 it is established that Pch>0, the engine 18 is started. Then, the charging electric power command value Pch is added to the required engine output.

On the other hand, the charging/discharging control portion 150 sets the charging electric power command value Pch=0 if the estimated SOC value (#SOC) has not declined. Furthermore, when #SOC>SOCr (control center value), the charging/discharging control portion 150 sets Pch<0 so as to promote the discharging of the electricity storage device 10.

The travel control portion 200 calculates the vehicle drive force and the vehicle braking force that are needed in the hybrid vehicle 5 as a whole, according to the vehicle state of the hybrid vehicle 5 and the driver's operation. The driver's operation includes the amount of depression of the accelerator pedal (not shown), the position of the shift lever (not shown), the amount of depression of the brake pedal (not shown), etc.

Then, the travel control portion 200 determines the output requests to the motor-generators MG1 and MG2 and the output request to the engine 18 so as to achieve the requested vehicle driving force or the requested vehicle braking force.

The travel control portion 200, during the CD mode, determines the output requests to the motor-generators MG1 and MG2 and the output request to the engine 18 so that basically the engine 18 is stopped and the vehicle travels only by the drive force from the motor-generator MG2. During the CD mode, the travel control portion 200 starts the engine 18 when a special condition is satisfied. When the special condition is satisfied includes, for example, when a drive force request from a user, such as a sharp acceleration request or the like, is given. That is, during the CD mode, basically the engine 18 is stopped. Due to this, during the CD mode, the fuel economy of the hybrid vehicle 5 is improved and the amounts of emissions are reduced.

The travel control portion 200 determines the output requests to the motor-generators MG1 and MG2 and the output request to the engine 18 so that the SOC of the electricity storage device 10 is maintained within the certain range and the overall fuel economy is optimized. For example, the output requests are determined so that while the engine 18 is operated so as to avoid operation regions of bad fuel economy, the required power of the vehicle as a whole is secured. Due to this, energy efficiency heightens.

Incidentally, the output requests to the motor-generators MG1 and MG2 are set with such restrictions that the charging/discharging of the electricity storage device 10 is executed within a range of electric power (of Win to Wout) in which the electricity storage device 10 can be charged and discharged. Specifically, when a certain output electric power of the electricity storage device 10 cannot be secured, the output from the motor-generator MG1 and/or the motor-generator MG2 is restricted.

A distribution portion 250 computes the torques and rotation speeds of the motor-generators MG1 and MG2 according to the output requests to the motor-generators MG1 and MG2 set by the travel control portion 200. Then, the distribution portion 250 outputs control commands regarding torque and rotation speed to an inverter control portion 260 and, at the same time, outputs a control command value regarding the direct-current voltage Vh to a converter control portion 270.

Furthermore, the distribution portion 250 generates an engine control indication that shows the engine power and a target engine rotation speed that are determined by the travel control portion 200. In accordance with the engine control indication, the fuel injection, the ignition timing, the valve timing, etc., of the engine 18 (FIG. 2) are controlled.

The inverter control portion 260 generates switching commands PWM1 and PWM2 for driving the motor-generators MG1 and MG2 according to the control commands from the distribution portion 250. The switching command PWM1 is output to the first inverter 8-1. The switching command PWM2 is output to the second inverter 8-2.

The converter control portion 270 generates a switching command PWC so that the direct-current voltage Vh is controlled in accordance with the control command from the distribution portion 250. The charging/discharging electric power of the electricity storage device 10 is controlled by the voltage conversion performed by the converter 6 in accordance with the switching command PWC.

Thus, there is realized a traveling control of the hybrid vehicle 5 in which energy efficiency is heightened according to the vehicle state and the driver's operation while actively performing the EV traveling based on selection of the CD mode.

At the time of the external charging, the charging/discharging control portion 150 generates a charging command Pr# while monitoring the estimated SOC value (#SOC). The charging command Pr# includes a signal that indicates activation and stop of the external charging portion 30, and the value of charging electric power that the external charging portion 30 needs to output. An external charging control portion 280, on the basis of the values of voltage and current detected at the time of charging, generates a control signal PWCH for the external charging portion 30 so that the charging of the electricity storage device 10 is controlled in accordance with the charging command Pr#.

In a construction shown in FIG. 5, the travel control portion 200 includes a counter 220. The counter 220 is used to measure the aforementioned "HV travel execution degree". In this embodiment, the counter 220 counts and stores the HV traveling distance after the previous execution of the external charging. That is, the count value CNT of the counter 220 is incremented according to the HV traveling distance following the previous execution of the external charging. Then, the counter 220 initializes (clears) the stored count value CNT to zero when the external charging is newly executed. Therefore, the count value CNT of the counter 220 serves as a parameter that shows the accumulated value of the HV traveling distance (hereinafter, referred to also as "accumulated HV traveling distance value") that is accumulated from the previous execution of the external charging up to the present time point. The travel control portion 200 determines whether to perform the HV traveling (i.e., whether to activate the engine 18) according to the count value CNT of the counter 220 (the accumulated HV traveling distance value). The determination as to whether to perform the HV traveling (weather to activate the engine 18) is executed in the following manner.

Figure 6:
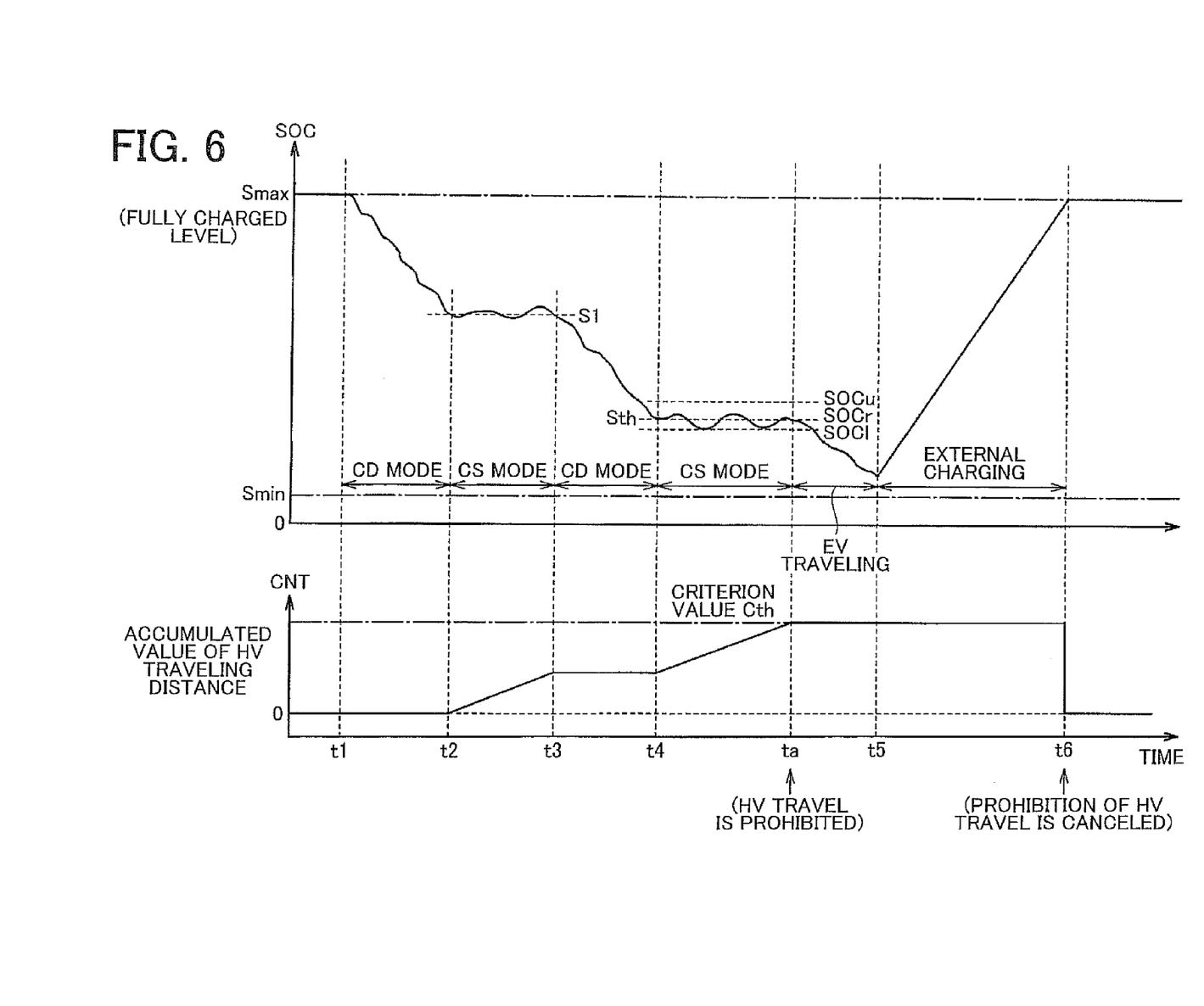
FIG. 6 is a conceptual diagram for describing representative examples of transitions of the travel mode, the SOC and the accumulated HV traveling distance value in the hybrid vehicle according to the embodiment of the invention.

FIG. 6 shows representative transitions of the travel mode, the SOC and the accumulate HV traveling distance value in the hybrid vehicle according to the embodiment of the invention.

Description will be made hereinafter with reference to FIG. 6. As in FIG. 4, before time t1, the electricity storage device 10 is charged to the fully charged level by the external charging. Therefore, at time t1, the count value CNT of the counter 220 (the accumulated HV traveling distance value) has been cleared (CNT=0).

When at time t1 the traveling of the hybrid vehicle 5 is started, the hybrid vehicle 5 travels in the CD mode during the period of time t1 to time t2. During the CD mode, the EV traveling is mainly conducted, so that the count value CNT of the accumulated HV traveling distance value does not substantially increase.

Then, if, at time t2, the CS mode is selected by a user operating the selector switch 26 while the vehicle is traveling in the CD mode, the SOC control in the CS mode is executed by using as the control center value the SOC occurring at the time point (t2) when the selection switch 26 is operated. During the CS mode, according to the decline in the SOC, the engine 18 is operated to execute the HV traveling. As a result, the count value of the accumulated HV traveling distance value gradually increases.

At time t3, the sector switch 26 is operated again, so that the travel mode returns to the CD mode. From time t3 on, as during the period from time t1 to time t2, as the hybrid vehicle 5 travels on, the SOC gradually declines but the count value CNT substantially does not increase.

When the estimated SOC value (#SOC) declines to the mode determination criterion value Sth (time t4), the travel mode switches from the CD mode to the CS mode. From time t4 on, as during the period from time t2 to time t3, the charging/discharging of the electricity storage device 10 is controlled so that the SOC of the electricity storage device 10 is maintained within the certain range (of SOCl to SOCu) whose center is the control center value SOCr. Therefore, while the SOC is maintained in the certain range (of SOCl to SOCu), the count value CNT of the accumulated HV traveling distance value gradually increases.

When the count value CNT of the accumulated HV traveling distance value reaches a predetermined criterion value Cth (time ta), the travel control portion 200 prohibits the HV traveling. That is, operation of the engine 18 is prohibited. Therefore, from time ta on, the hybrid vehicle 5 conducts the EV traveling. During the EV traveling, since the engine 18 is kept stopped, the count value CNT is kept at the criterion value Cth.

Then, when the external charging is started (time t5) after the hybrid vehicle 5 finishes traveling, the SOC of the electricity storage device 10 begins to increase. When at time t6 the external charging is completed as the SOC reaches the fully charged level (Smax), the travel control portion 200 cancels the prohibition of the HV traveling. That is, when the external charging is newly executed, the prohibition of the traveling that uses the engine 18 is canceled. Due to this, the operation of the engine 18 is permitted, and the HV traveling that uses output of the engine 18 is allowed again. Furthermore, the travel control portion 200 clears the count value CNT (CNT=0). Due to this, the state prior to time t1 is resumed.

Figure 7:
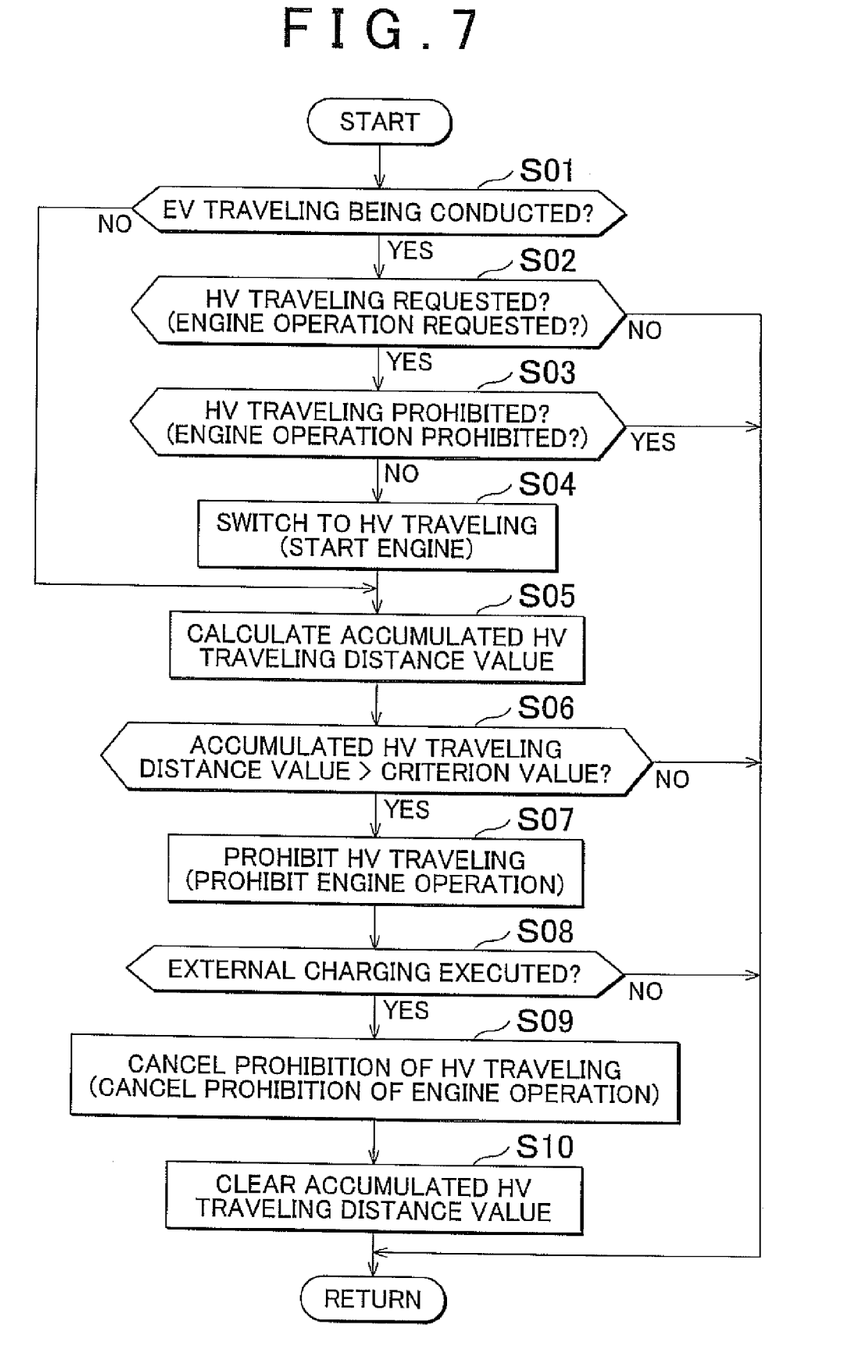
FIG. 7 is a flowchart for describing a processing procedure of determining whether to conduct the HV traveling of the hybrid vehicle according to the embodiment of the invention.

FIG. 7 is a flowchart for describing a processing procedure of determining whether to conduct the HV traveling of the hybrid vehicle according to the embodiment of the invention. The control process illustrated by the flowchart shown in FIG. 7 is executed at a predetermined cycle time by the control device 100. The control process illustrated by the flowchart shown in FIG. 7 corresponds to part of the function of the travel control portion 200.

Hereinafter, description will be made with reference to FIG. 7. The control device 100 determines in step S01 whether the hybrid vehicle 5 is conducting the EV traveling. If the hybrid vehicle 5 is not conducting the EV traveling (if the answer to the determination in step S01 is NO), that is, when the hybrid vehicle 5 is conducting the HV traveling, the control device 100 calculates, in step S05 (described later), the accumulated HV traveling distance value that has been accumulated following the previous execution of the external charging.

When the hybrid vehicle 5 is conducting the EV traveling (if the answer to the determination in step S01 is YES), the control device 100 further determines in step S02 whether the HV traveling has been requested. The request for the HV traveling corresponds to an operation request to the engine 18. As described above, during the CD mode, operation of the engine 18 is requested in the case where a special condition is satisfied, such as the case where a drive force request from a user, such as a request for sharp acceleration or the like, is made. Furthermore, during the CS mode, operation of the engine 18 is requested when the SOC of the electricity storage device 10 has declined.

If the request for the HV traveling during the EV traveling has not been made (if the answer to the determination in step S02 is NO), the process returns to the beginning. Due to this, the engine 18 is kept in the stopped state. On the other hand, if the request for the HV traveling has not been made (if the answer to the determination in step S02 is YES), the control device 100 determines in step S03 whether the HV traveling has been prohibited. If the HV traveling has been prohibited (if the answer to the determination in step S03 is YES), the process returns to the beginning.

Conversely, if the HV traveling has been permitted (if the answer to the determination in step S03 is NO), the control device 100 proceeds to step S04, in which the control device 100 starts the engine 18, so that the traveling of the vehicle switches from the EV traveling to the HV traveling.

During the HV traveling, the control device 100 calculates in step S05 the accumulated HV traveling distance value that has been accumulated following the previous execution of the external charging. Concretely, the control device 100 increments the count value CNT of the counter 220 (FIG. 5) according to the HV traveling distance accumulated following the previous execution of the external charging.

Then, in step S06, the control device 100 compares the accumulated HV traveling distance value (count value CNT) calculated in step S05 with the criterion value Cth. If the accumulated HV traveling distance value CNT is less than or equal to the criterion value Cth (if the answer to the determination in step S06 is NO), the process returns to the beginning. That is, the engine 18 is kept in operation, so that the hybrid vehicle 5 continues the HV traveling.

Conversely, if the accumulated HV traveling distance value CNT is greater than the criterion value Cth (if the answer to the determination in step S06 is YES), the control device 100 prohibits the HV traveling in step 07. Due to this, since operation of the engine 18 is prohibited, the operation of the engine 18 is stopped.

Then, in step S08, the control device 100 determines whether the external charging of the electricity storage device 10 has been executed. If the external charging has not been executed (if the answer to the determination in step S08 is NO), the process returns to the beginning.

On the other hand, if it is determined that the external charging has been executed (if the answer to the determination in step S08 is YES), the control device 100 cancels the prohibition of the HV traveling in step S09. Due to this, the prohibition of operation of the engine 18 is canceled, and the HV traveling is allowed again. Furthermore, in step S10, the control device 100 clears the accumulated HV traveling distance value CNT stored in the counter 220.

Thus, if the accumulated HV traveling distance value that has been accumulated following the previous execution of the external charging exceeds the criterion value, the HV traveling is prohibited and, therefore, the internal charging of the electricity storage device 10 is restricted, during the period until the external charging is newly executed. Thus, the SOC of the electricity storage device 10 declines, and therefore a guidance that prompts the external charging of the electricity storage device 10 is provided for the user. As a result, the opportunities of execution of the external charging are increased, so that securement of an EV traveling distance can easily be achieved.

Incidentally, the flowchart shown in FIG. 7 illustrates, as an example, the arrangement in which the prohibition of the HV traveling is canceled when the external charging is newly executed. However, if at the time of the external charging, the time of charging of the electricity storage device 10 or the amount of electricity stored in the device 10 is restricted, the electricity storage device 10 cannot be charged to the fully charged level. Therefore, the electric power that the electricity storage device 10 is able to output may possibly decline. In that case, the output of the motor-generator MG2 is restricted, so that there is possibility that the EV traveling can be restricted. Therefore, there may be adopted a construction in which the prohibition of the HV traveling is canceled if the SOC of the electricity storage device 10 when the external charging has been newly executed is greater than a predetermined threshold value. That is, there may be adopted a construction in which if the amount of charge remaining in the electricity storage device 10 is greater than or equal to a predetermined value when the external charging has been newly executed, the prohibition of the traveling that uses the engine 18 is canceled.

Figure 8:
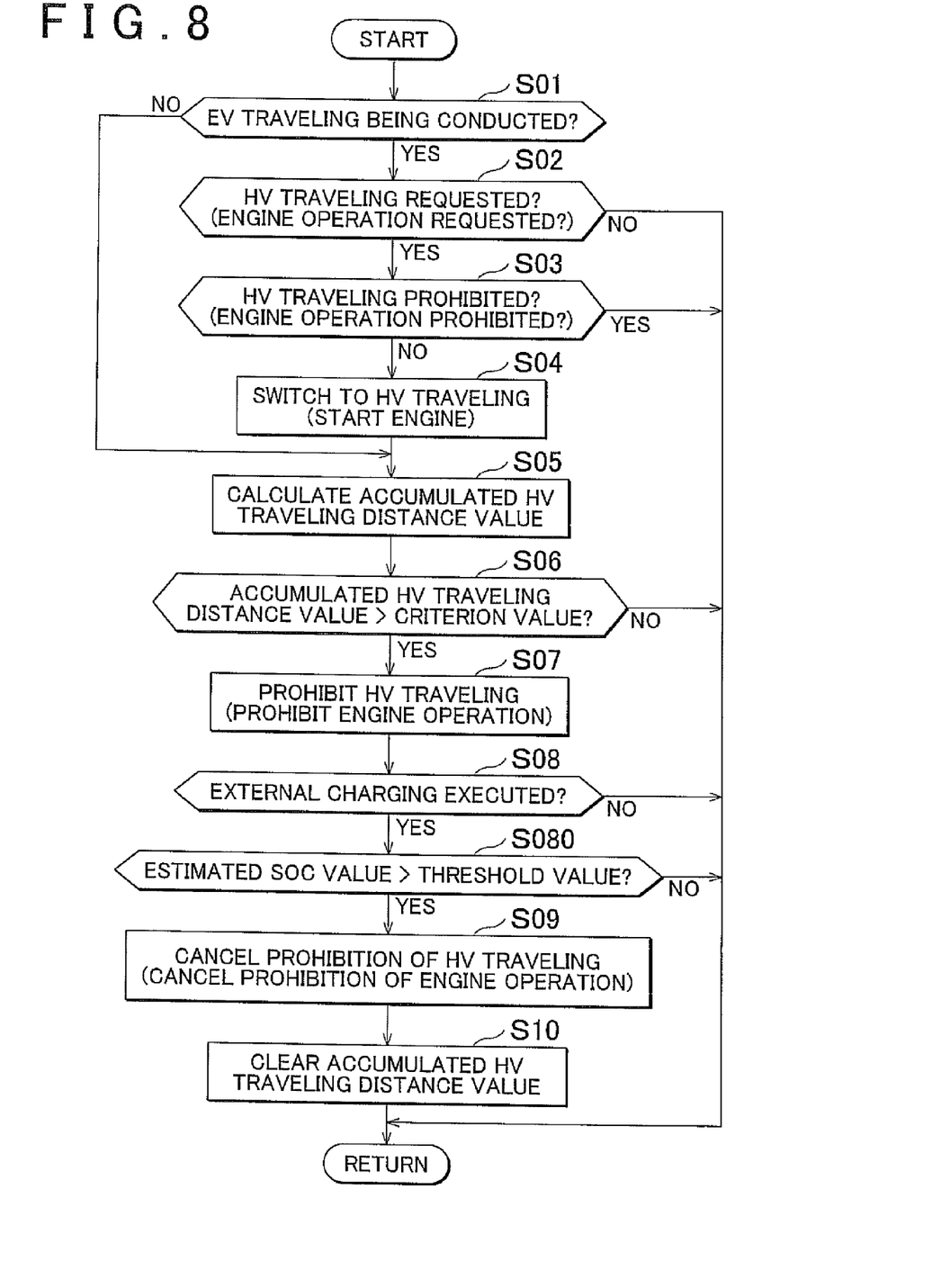
FIG. 8 is a flowchart illustrating a processing procedure of determining whether to conduct the HV traveling in a hybrid vehicle according to a modification of the embodiment of the invention.

FIG. 8 is a flowchart illustrating a processing procedure of determining whether to conduct the HV traveling in a hybrid vehicle according to a modification of the embodiment of the invention.

Hereinafter, description will be made with reference to FIG. 8. In steps S01 to S07 similar to those in FIG. 7, the control device 100 prohibits the HV traveling according to the accumulated HV traveling distance value that is accumulated following the previous execution of the external charging. Then, in step S08 as in FIG. 7, the control device 100 determines whether the external charging of the electricity storage device 10 has been executed. If the external charging has not been executed (if the answer to the determination in step S08 is NO), the process returns to the beginning.

On the other hand, if it is determined that the external charging has been executed (if the answer to the determination in step S08 is YES), the control device 100 then determines in step S080 whether the estimated SOC value (#SOC) of the electricity storage device 10 is greater than a predetermined threshold value. If the estimated SOC value is greater than the threshold value (if the answer to the determination in step S080 is YES), the control device 100, in steps S09 and S10 as in FIG. 7, cancels the prohibition of the HV traveling and clears the accumulated HV traveling distance value CNT stored in the counter 220. On the other hand, if the estimated SOC value is less than or equal to the threshold value (if the answer to the determination in step S080 is NO) although the external charging has been newly executed, the process returns to the beginning. That is, since the prohibition of the HV traveling is not canceled, the engine 18 in the stopped state continues to be stopped.

Incidentally, the foregoing embodiment of the invention has been described in conjunction with an example in which the accumulated value of the HV traveling distance following the previous execution of the external charging is used as a parameter that shows the degree of execution of the HV traveling (HV traveling execution degree) following the previous execution of the external charging. However, the foregoing example is not restrictive but may be replaced with any other construction as long as the execution record of the HV traveling (i.e., the operation record of the engine) can be indicated as a result. For example, it is possible to use the accumulated value of the time duration of operation of the engine following the previous execution of the external charging, or either one of the amount of fuel consumed by the engine and the amounts of emissions of the engine which follow the previous execution of the external charging, etc.

Furthermore, the embodiment of the invention has been described above in conjunction with a construction in which execution of the HV traveling is prohibited if the degree of execution of the HV traveling (HV traveling execution degree) following the previous execution of the external charging exceeds a predetermined degree. However, there may also be adopted a construction in which the HV traveling execution degree is compared with the degree of execution of the EV traveling (hereinafter, referred to as "EV traveling execution degree") following the previous execution of the external charging, and in which if the HV traveling execution degree is greater than the EV traveling execution degree, execution of the HV traveling is prohibited. For example, if the accumulated value of the HV traveling distance following the previous execution of the external charging is greater than the accumulated value of the EV traveling distance following the previous execution of the external charging, execution of the HV traveling is prohibited. In that case, when the prohibition of the HV traveling is canceled, both the accumulated HV traveling distance value and the accumulated EV traveling distance value are initialized to zero.

Furthermore, the hybrid vehicle according to the embodiment of the invention has been described above in conjunction with a construction in which if the HV traveling execution degree is greater than the predetermined degree, execution of the HV traveling is prohibited. However, the foregoing construction is not restrictive but can be replaced with any other construction as long as it is possible to restrain execution of the HV traveling during the period until the external charging is newly executed. For example, instead of the construction in which execution of the HV traveling is prohibited, there may be adopted a construction in which during the period until the external charging is newly executed, a predetermined restriction is imposed on the HV traveling distance, the time duration of operation of the engine, the amount of fuel consumption, the amounts of emissions, etc. That is, embodiments of a control for restraining execution of the HV traveling include the construction that prohibits execution of the HV traveling and the construction that restricts execution of the HV traveling.

As described above, in the hybrid vehicle according to the embodiment of the invention, the vehicle-mounted electricity storage device is configured to be capable of the internal charging during the HV traveling and capable of the external charging after the vehicle finishes traveling. In such a plug-in type hybrid vehicle, certain opportunities of execution of the external charging can be secured by restricting the degree of execution of the HV traveling. As a result, it becomes possible to sufficiently exploit the advantages of the plug-in type hybrid vehicle, such as improvement of the fuel economy and reduction of the amounts of emissions.

Incidentally, the foregoing embodiment has been described above in conjunction with a construction of a vehicle in which the engine 18 is mounted as a drive force source and charging electric power for the electricity storage device 10 can be generated from output of the engine 18, as an example of the plug-in type hybrid vehicle. However, the application of the invention is not limited to the hybrid vehicles as described above. Concretely, the invention is applicable to any vehicle as long as the vehicle is equipped with an electric power generation mechanism that charges an on-board electricity storage device during the traveling of the vehicle and an external charging portion that charges the electricity storage device with electric power from a device provided outside the vehicle after the vehicle finishes traveling. This will be further described below for a confirmation purpose. For example, the invention is applicable to hybrid vehicles that have a hybrid construction different from that illustrated in FIG. 1 (e.g., a so-called series hybrid construction, an electrical distribution type hybrid construction) and to fuel cell motor vehicles as well.

The embodiments, the modifications thereof, etc. disclosed above are merely illustrative in all respects and are not restrictive at all. The scope of the invention is shown not by the foregoing description but by the appended claims for patent, and includes all modifications and changes within the meaning and scope equivalent to the claims for patent.

What is claimed is:

1. A hybrid vehicle provided with an engine and an electric motor that is used to drive the hybrid vehicle, comprising:
    an electricity storage device that outputs electric power to the electric motor and receives electric power from the electric motor and that is charged with electricity generated by using output of the engine;
    an external charging portion that charges the electricity storage device with electric power supplied from outside the vehicle; and
    a control device that controls switching between traveling of the vehicle which does not use the engine but uses the electric motor and traveling of the vehicle which uses the engine,
    wherein the control device restrains the traveling of the vehicle which uses the engine, when an accumulated value of travel distance that is covered by the vehicle when the vehicle travels using the engine, following a previous execution of charging by the external charging portion, exceeds an accumulated value of the travel distance that is covered by the vehicle when the vehicle travels without using the engine but with using the electric motor for driving the vehicle, following the previous execution of the charging by the external charging portion, and
    wherein the control device initializes the accumulated value of the travel distance covered by the vehicle when the vehicle travels with using the engine and the control device initializes the accumulated value of the travel distance covered by the vehicle when the vehicle travels without using the engine but with using the electric motor, in response to cancellation of the restraint of the traveling of the vehicle which uses the engine,
    wherein the control device makes the cancellation of the restraint of the traveling of the vehicle which uses the engine when charging is newly executed by the external charging portion.

2. The hybrid vehicle according to claim 1, wherein the control device restrains the traveling of the vehicle which uses the engine, when an accumulated value of travel distance that is covered by a vehicle when the vehicle travels using the engine, following the previous execution of the external charging by the external charging portion, exceeds a predetermined threshold value, and the control device initializes the accumulated value of the travel distance, when cancelling the restraint of the traveling that uses the engine.

3. The hybrid vehicle according to claim 1, wherein the control device restrains the traveling that uses the engine, when an accumulated value of operation time of the engine, following the previous execution of charging by the external charging portion, exceeds a predetermined threshold value, and the control device initializes the accumulated value of the operation time of the engine, when cancelling the restraint of the traveling of the vehicle which uses the engine.

4. The hybrid vehicle according to claim 1, wherein:
    the engine is constructed so as to be operated by combustion of fuel; and
    the control device restrains the traveling of the vehicle which uses the engine, when amount of fuel consumed, following the previous execution of charging by the external charging portion, exceeds a predetermined threshold value, and the control device initializes the amount of fuel consumed, when cancelling the restraint of the traveling of the vehicle which uses the engine.

5. The hybrid vehicle according to claim 1, wherein the control device restrains the traveling that uses the engine, when amount of exhaust gas emitted from the engine, following the previous execution of charging by the external charging portion, exceeds a predetermined threshold value, and the control device initializes the amount of exhaust gas, when canceling the restraint of the traveling of the vehicle which uses the engine.

6. A hybrid vehicle provided with an engine and an electric motor that is used to drive the hybrid vehicle, comprising:
    an electricity storage device that outputs electric power to the electric motor and receives electric power from the electric motor and that is charged with electricity generated by using output of the engine;
    an external charging portion that charges the electricity storage device with electric power supplied from outside the vehicle; and a control device that controls switching between traveling of the vehicle which does not use the engine but uses the electric motor and traveling of the vehicle which uses the engine, wherein the control device restrains the traveling of the vehicle which uses the engine, when an accumulated value of travel distance that is covered by the vehicle when the vehicle travels using the engine, following the previous execution of charging by the external charging portion, exceeds an accumulated value of the travel distance that is covered by the vehicle when the vehicle travels without using the engine but with using the electric motor for driving the vehicle, following the previous execution of the charging by the external charging portion, and wherein the control device initializes the accumulated value of the travel distance covered by the vehicle when the vehicle travels with using the engine and the control device initializes the accumulated value of the travel distance covered by the vehicle when the vehicle travels without using the engine but with using the electric motor, in response to cancellation of the restraint of the traveling of the vehicle which uses the engine, the control device makes the cancellation of the restraint of the traveling of the vehicle which uses the engine, when amount of electricity remaining in the electricity storage device is greater than or equal to a predetermined amount when charging has been newly executed by the external charging portion.

* * * * *